United States Patent
Takagi et al.

(10) Patent No.: US 6,799,324 B1
(45) Date of Patent: *Sep. 28, 2004

(54) DISC DRIVING APPARATUS

(75) Inventors: Keiichi Takagi, Tokorozawa (JP);
Toshiyuki Kaneko, Tokorozawa (JP);
Masaaki Kiyomiya, Tokorozawa (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,519

(22) Filed: Apr. 16, 1998

(30) Foreign Application Priority Data

Apr. 17, 1997 (JP) .......................................... P09-115211

(51) Int. Cl.⁷ ............................................. G11B 17/028
(52) U.S. Cl. ...................... 720/712; 720/710; 720/706
(58) Field of Search ................................ 369/271, 77.1, 369/75.1, 75.2, 270; 720/706, 710, 711, 712

(56) References Cited

U.S. PATENT DOCUMENTS

| | | | | |
|---|---|---|---|---|
| 4,618,951 A | * | 10/1986 | Okita et al. ................. | 369/270 |
| 4,649,445 A | * | 3/1987 | Sheriff ...................... | 360/99.04 |
| 4,736,358 A | * | 4/1988 | Hoshi et al. ................ | 369/270 |
| 4,737,948 A | * | 4/1988 | Okita ........................ | 369/270 |
| 4,747,002 A | * | 5/1988 | Takikawa et al. ......... | 360/99.05 |
| 5,006,945 A | * | 4/1991 | Furusawa ................ | 360/99.12 |
| 5,555,233 A | * | 9/1996 | Yano et al. ................. | 369/270 |
| 5,761,186 A | * | 6/1998 | Mushika et al. ............ | 369/271 |
| 5,796,709 A | * | 8/1998 | Ootsuka ..................... | 369/271 |

* cited by examiner

Primary Examiner—William Klimowicz
(74) Attorney, Agent, or Firm—Ladas & Parry (57) ABSTRACT

A disc driving apparatus is provided with: a turn table on which a disc type record medium is loaded; a clamper opposed to the turn table for clamping the disc type record medium on the turn table by means of a magnetic force applied between the turn table and the clamper; and a spindle motor for rotationally driving the turn table. The clamper has at least 3 abutting portions for abutting to the disc type record medium such that only one of the abutting portions is respectively on a line passing through a center of the clamper in a plain parallel to a record surface of the disc type record medium.

17 Claims, 5 Drawing Sheets

DISC DRIVING APPARATUS

BACKGROUND OF THE INVENTION

1. Field of the Invention

The present invention relates to a disc driving apparatus for rotationally driving a disc type record medium in an optical disc player or the like, and more particularly relates to the disc driving apparatus having a clamping mechanism for favorably clamping the disc type record medium in a stable manner.

2. Description of the Related Art

When an optical disc is loaded on an optical disc player, the optical disc is clamped and is rotationally driven by the optical disc driving apparatus equipped in the optical disc player.

The optical disc driving apparatus is constructed such that, in order to clamp the optical disc, a loading surface of a turn table abuts to one surface of the loaded optical disc while a circumferential abutting portion of the clamper abuts to the other surface of the loaded optical disc.

Figure 6:
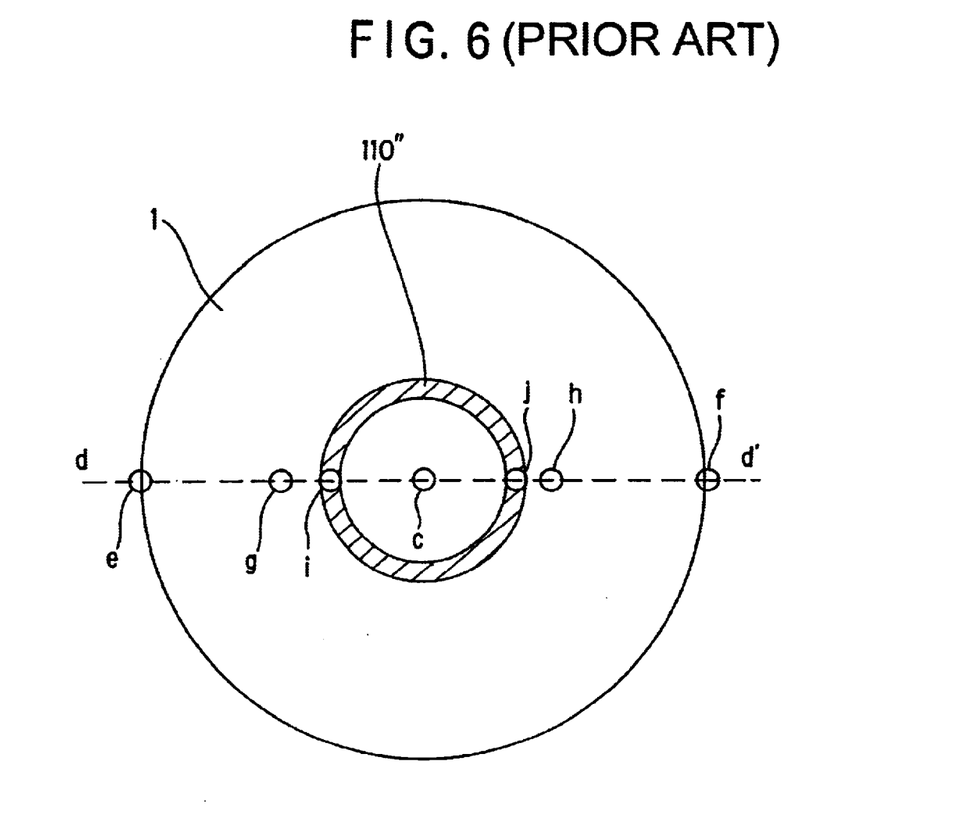
FIG. 6 is a diagram showing a surface of an optical disc and indicating an abutting area at which an abutting portion of a clamper abut to the surface of the optical disc in an optical disc driving apparatus according to the related art.

More concretely, the circumferential abutting portion of the clamper abuts to a circumferential abutting area 110" on the surface of an optical disc 1 as shown in FIG. 6. The circumferential abutting area 110" is located at an inner circumferential area of the surface of the optical disc 1, which is close to a center hole c of the optical disc 1 and at which record information is not recorded. A pressure is applied by the circumferential abutting portion of the clamper to the circumferential abutting area 110" of the optical disc 1 on the loading surface of the turn table, so as to tightly hold the optical disc 1 while a spindle motor of the optical disc driving apparatus rotationally drives the clamped optical disc 1 by rotating the turn table as well as the clamper.

In the above explained construction, when the optical disc 1 is rotationally driven by the spindle motor, since the optical disc 1 has an inherent vibration mode, the optical disc 1 itself is excited in accompaniment with the rotation of the spindle motor. Particularly, by the vibration component in the frequency range of about 700 Hz to 800 Hz of the optical disc 1, (i) an actuator which drives an objective lens of an optical head for reading the record information on the optical disc 1 in a focus direction and in a tracking direction and (ii) the optical disc 1 resonate. Thus, the vibration due to the resonance is applied to the servo control of the actuator for the focusing control, the tracking control and the like, as an external disturbance, so that the harmful influence is given e.g., the servo cannot be closed.

Figure 7:
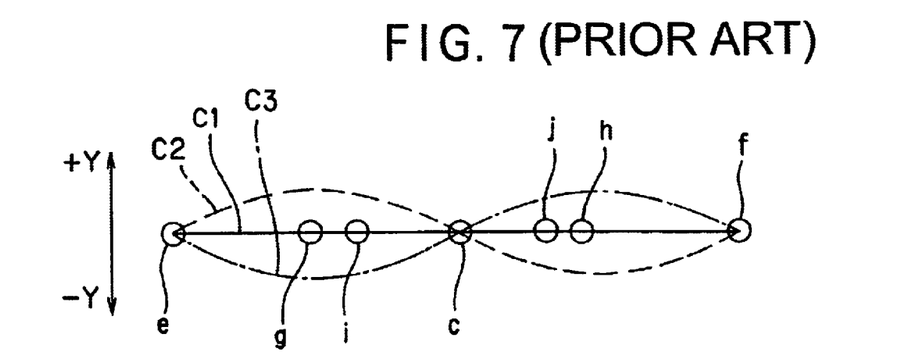
FIG. 7 is a diagram for explaining a vibration mode of the optical disc driving apparatus of FIG. 6.

Here, the vibration mode of the optical disc 1 due to the vibration component in the frequency range of about 700 Hz to 800 Hz at the time of rotationally driving the optical disc 1 is explained with reference to FIGS. 6 and 7. In FIG. 6, a line d–d' is a line passing through the center c of the optical disc 1, points e and f are on the line d–d' at the outer circumference of the optical disc 1, a point g is on the line d–d' between the center c and the point e, a point h is on the line d–d' between the center c and the point f, and points i and j are on the line d–d' and in the circumferential abutting area 110". FIG. 7 is a diagram for explaining a vibration mode of the optical disc 1. More concretely, FIG. 7 schematically shows a section at the line d–d' of the optical disc 1, in which the form of the optical disc 1 is changed by the vibration as indicated by a solid line C1, a dashed line C2 and a chain line C3.

In FIG. 7, when the optical disc 1 is rotationally driven by the spindle motor, the vibration due to the rotation is transmitted from the turn table and the clamper. At this time, since the optical disc 1 is circumferentially held by the turn table and the clamper at the circumferential abutting area 110", the vibration transmitted from the spindle motor is radially transmitted over the whole surface of the optical disc 1 from the circumferential abutting area 110". Therefore, by this transmission of the vibration, at a certain time point, the forces are applied to the point i in a +Y direction and to the point j in a –Y direction, so that the forces are transmitted toward the outer circumference of the optical disc 1 along the line d–d'. This results in that the forces are applied to the points g and h in the +Y and –Y directions respectively. At this time, since the forces in the +Y and –Y directions are not transmitted yet to the points e and f respectively, the optical disc 1 is transiently distorted to have the form indicated by the dashed line C2. On the other hand, at another certain time point, the forces are applied to the points e, f, g and h respectively in the directions reverse to the directions in the above mentioned case, so that the optical disc 1 is transiently distorted to have the form indicated by the chain line C3. Namely, since the forces are applied to the points i and j on the line d–d' passing through the center c in the directions reverse to each other, the transient distortions indicated by the dashed line C2 and the chain line C3 are alternatively repeated, so that the vibration of the optical disc 1 is generated.

SUMMARY OF THE INVENTION

It is therefore an object of the present invention to provide a disc driving apparatus for rotationally driving a disc type record medium, which can restrain the resonance due to a vibration mode of the disc type record medium, e.g., the resonance in a frequency range of about 700 Hz to 800 Hz when rotationally driving the disc type record medium.

The above object of the present invention can be achieved by a disc driving apparatus provided with: a turn table on which a disc type record medium is loaded; a clamper opposed to the turn table for clamping the disc type record medium on the turn table by means of a magnetic force applied between the turn table and the clamper; and a spindle motor for rotationally driving the turn table, the clamper comprising at least 3 abutting portions for abutting to the disc type record medium such that only one of the abutting portions is respectively on a line passing through a center of the clamper in a plain parallel to a record surface of the disc type record medium.

According to the disc driving apparatus of the present invention, the disc type record medium is loaded on the turn table, and is clamped by the clamper on the turn table by means of the magnetic force applied therebetween. Then, the turn table is rotationally driven by the spindle motor. At this time, the clamper has at least 3 abutting portions such that only one of the abutting portions is respectively on the line passing through the center of the clamper. Namely, any two of the abutting portions are not on a same line passing through the center of the clamper but are on different lines passing through the center of the clamper. Thus, on each of the lines passing though the center of the disc type record medium, the forces are not simultaneously applied in the directions different from each other. Accordingly, the vibration of the inherent vibration mode of the disc type record medium, e.g., the vibration in a frequency range of about 700 Hz to 800 Hz, when rotationally driving the disc type record medium, can be certainly restrained.

In one aspect of the disc driving apparatus of the present invention, the turn table has a circumferential loading surface for loading the disc type record medium thereon, and each of the abutting portions is shaped in a sector disposed substantially at equiangular positions in a circumference direction of the clamper.

According to this aspect, the disc type record medium can be clamped in a stable manner while the vibration of the inherent vibration mode of the disc type record medium can be certainly restrained.

In another aspect of the disc driving apparatus of the present invention, the turn table is provided with: a hub having a cylindrical engaging portion for engaging with a center hole of the disc type record medium and a taper portion for guiding the center hole to the cylindrical engaging portion; and a circumferential loading surface for loading the disc type record medium thereon, and the clamper is provided with: a taper portion proximate to the taper portion of the hub when clamping the disc type record medium; and a proximity portion, which is formed at a connection between the taper portion of the clamper and each of the abutting portions and is disposed more proximate to the hub than the taper portion of the clamper in a radial direction of the disc type record medium.

According to this aspect, by virtue of the proximity portion, it is possible to restrain the backlash of the disc type record medium and the clamper due to the reduction in an abutting area in the circumferential direction of the disc type record medium.

In another aspect of the disc driving apparatus of the present invention, the clamper has a yoke for receiving the magnetic force from the hub and absorbing the clamper onto the turn table.

According to this aspect, the disc type record medium can be clamped in a stable manner by means of the magnetic force between the clamper and the turn table. In this case, the magneto may be built in the turn table. Alternatively, the turn table may have a yoke while the magneto may be built in the clamper.

In another aspect of the disc driving apparatus of the present invention, each of the abutting portions has such a shape that two sectors, each of which has a center thereof at the center of the clamper, are combined together in a radial direction of the clamper.

According to this aspect, by virtue of the abutting portions each having the specific shape, the disc type record medium can be clamped in a stable manner.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1:
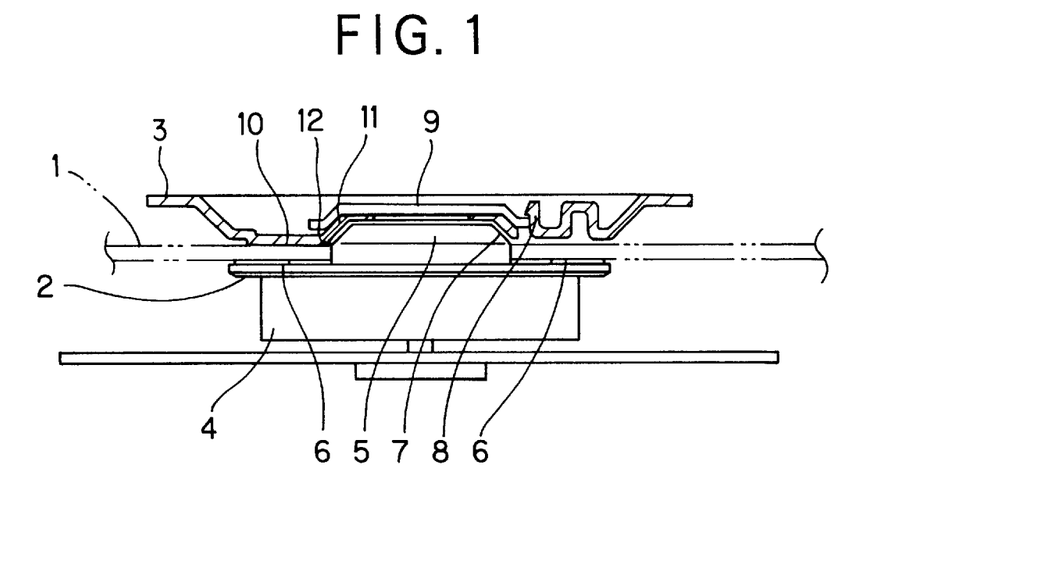
FIG. 1 is a partially sectional front view of an optical disc driving apparatus as an embodiment of the present invention.

Referring to the accompanying drawings, an embodiment of the present invention will be now explained. FIG. 1 shows a sectional view of a clamper and an optical disc, and also shows a front view of a turn table and a spindle motor in an optical disc driving apparatus as an embodiment of the present invention.

In FIG. 1, the optical disc driving apparatus is provided with: a turn table 2 on which an optical disc 1 is loaded; a clamper 3 opposed to the turn table 2 through the optical disc 1; and a spindle motor 4, which rotation shaft (not shown) is engaged with a center hole of the turn table 2 for directly rotating the turn table 2.

The turn table 2 has: a hub 5 which is engaged with a center hole of the optical disc 1; and a circumferential loading surface 6 on which the optical disc 1 is loaded. The hub 5 is provided with: a taper portion 7 for guiding the hub 5 into the center hole of the optical disc 1 so as to easily engage the hub 5 with the center hole of the optical disc 1; and a cylindrical engaging portion 8 for engaging with the internal circumferential side wall of the center hole of the optical disc 1. A magneto (not shown) is built in the hub 5, which generates a magnetic force. The engaging portion 8 is shaped in a cylinder which central axis is coincident with the rotational axis of the turn table 2.

Figure 2:
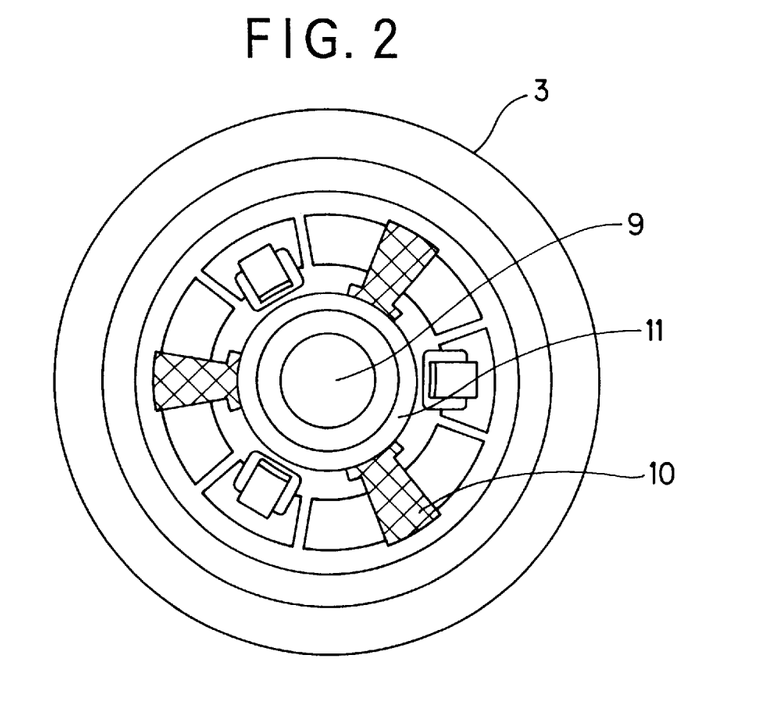
FIG. 2 is a plan view of a clamper in the optical disc driving apparatus of FIG. 1.

As shown in FIG. 2 as well as FIG. 1, the clamper 3 is provided with: a clamper yoke 9 for receiving the magnetic force from the hub 5 and absorbing the clamper 3 onto the turn table 2; 3 abutting portions 10, which are disposed at equiangular positions for each 120 degrees approximately and abut to the surface of the optical disc 1; and a taper portion 11 disposed at a vicinity of or in contact with the taper portion 7 of the hub 5. The abutting portions 10 are disposed such that each of them is positioned on respective one of different lines passing through the center of the clamper 3 in a plane substantially parallel to the recording surface of the optical disc 1. An abutting area of each of the abutting portions 10 has such a shape obtained by combining two sectors, each of which has a center thereof at the center of the clamper 3, in a radial direction of the clamper 3, as indicated by each meshed area in FIG. 2. At a connection of the taper portion 11 and each of the abutting portions 10, there is formed a proximity portion 12, which is substantially parallel to the circumferential side surface of the cylindrical engaging portion 8 of the hub 5 and is more proximate to the hub 5 than the taper portion 11 of the clamper 3 in the radial direction of the optical disc 1. The proximity portion 12 is in such a shape to be engaged with the circumferential side surface of the cylindrical engaging portion 8 of the turn table 2 when the turn table 2 and the clamper 3 abut to each other without holding the optical disc 1 therebetween.

The thickness of the optical disc 1 is varied within the tolerable range on the specification. Thus, in order that the abutting portions 10 abut to the optical disc 1 even in case that a thin optical disc 1 is loaded on the turn table 2, a predetermined clearance in the rotational axis direction of the turn table 2 is prepared between the loading surface 6 and the portions of the clamper 3 other than the abutting portions 10.

Incidentally, in the above explained embodiment, although the magneto is built in the hub 5 of the turn table 2 while the clamper yoke 9 is installed on the clamper 3, on the contrary, a yoke may be installed to the hub 5 of the turn table 2 in place of the built-in magneto while a magneto may be built in the clamper 3 in place of the clamper yoke 9.

Figure 3:
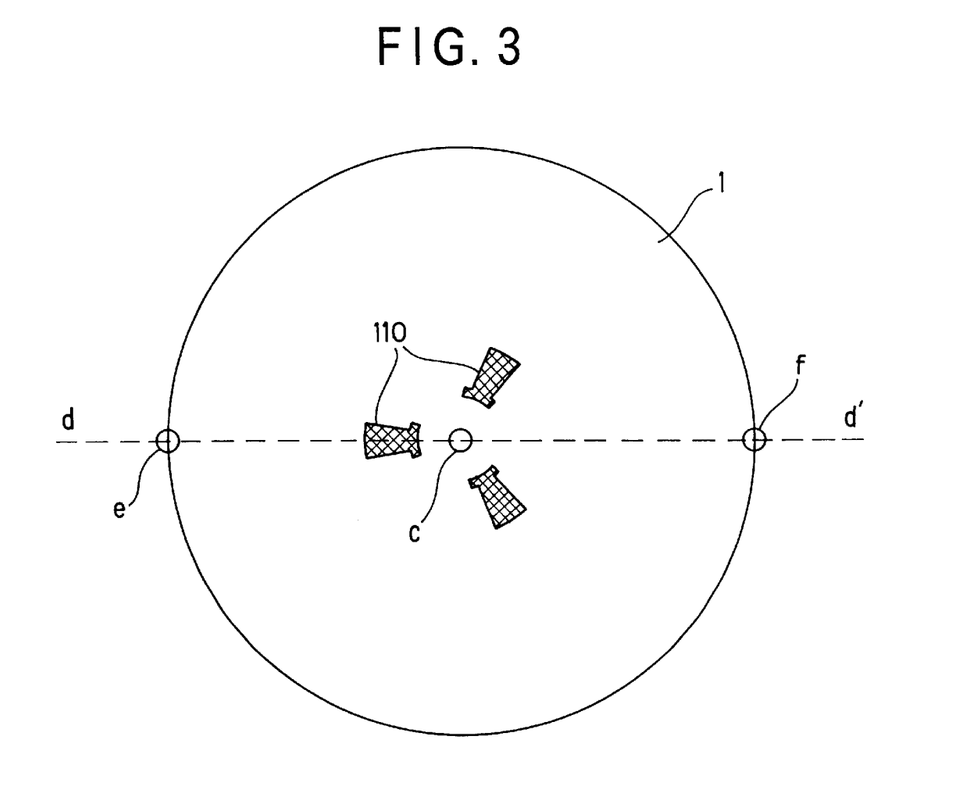
FIG. 3 is a diagram showing a surface of an optical disc and indicating abutting areas at which abutting portions of the clamper respectively abut to the surface of the optical disc in the optical disc driving apparatus of FIG. 1.

According to a construction of the present embodiment as described above, the abutting portions 10 of the clamper 3 in FIG. 2 respectively abut to the surface of the optical disc 1 at 3 abutting areas 110 as shown in FIG. 3 (as indicated by each meshed area). In FIG. 3, the constitutional element, the area, the points and the line same as those of FIG. 6 carry the same reference numerals and the explanations thereof are omitted.

As understood from FIG. 3, two abutting areas are not on a same line d–d' passing through the center c of the optical disc 1 as in the case of the related art of FIG. 6, but just one abutting area 110 is on the line d–d'. Accordingly, the vibration mode in the frequency range of about 700 Hz to 800 Hz of the optical disc 1 can be restrained when rotationally driving the optical disc 1. Namely, according to the present embodiment, such a condition does not occur that one force is applied to the point i (i.e. the abutting point) and at the same time another force is applied to the point j (which is another abutting point positioned on the same line d–d' as the point i) in direction different from each other due to the vibration, which is caused by the rotational driving operation of the spindle motor 4 and which is transmitted to the turn table 2 and the clamper 3 as shown in FIG. 7. Therefore, the vibration of the optical disc 1 can be certainly restrained according to the present embodiment. In addition, by virtue of the proximity portion 12, it is possible to restrain the backlash of the optical disc 1 and the clamper 2 due to the reduction in the abutting area in the circumferential direction of the optical disc, according to the present embodiment.

Figure 4:
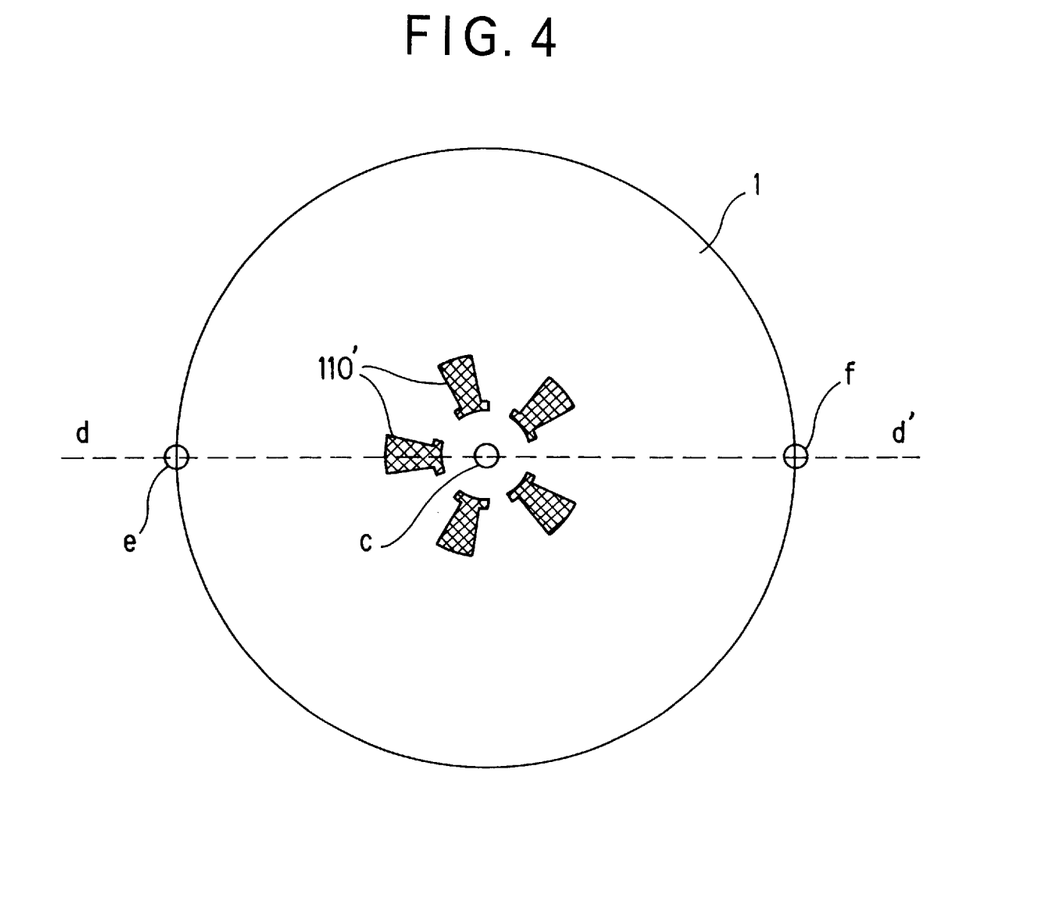
FIG. 4 is a diagram showing a surface of an optical disc and indicating abutting areas at which abutting portions of the clamper respectively abut to the surface of the optical disc in a modified embodiment of the present invention.

As a modified embodiment of the above described embodiment, instead of the 3 abutting portions 10 in FIG. 2, 5 abutting portions for abutting to the surface of the optical disc 1 may be disposed on the clamper 3 at equiangular positions for each 72 degrees approximately, so as to abut to the surface of the optical disc 1 at 5 abutting areas 110', as shown in FIG. 4. In FIG. 4, the constitutional element, the area, the points and the line same as those of FIG. 6 carry the same reference numerals and the explanations thereof are omitted.

In this modified embodiment, two abutting areas are not on the line d–d' but just one abutting area 110' is on the line d–d'. Thus, according to the modified embodiment, the effect to restrain the resonance due to the vibration mode can be obtained in the same manner as the embodiment shown in FIG. 3. In this manner, as long as more than three of the abutting portions are provided and that just one of them is on a same line passing through the center of the clamper, it is possible to restrain the vibration of the optical disc 1, which is caused by the rotational driving operation of the spindle motor and is transmitted to the turn table and the clamper, since the forces are not simultaneously applied in different directions to the abutting points on one line passing through the center of the optical disc 1, as in the aforementioned case of the points i and j (i.e. the abutting points) in FIG. 7.

Figure 5:
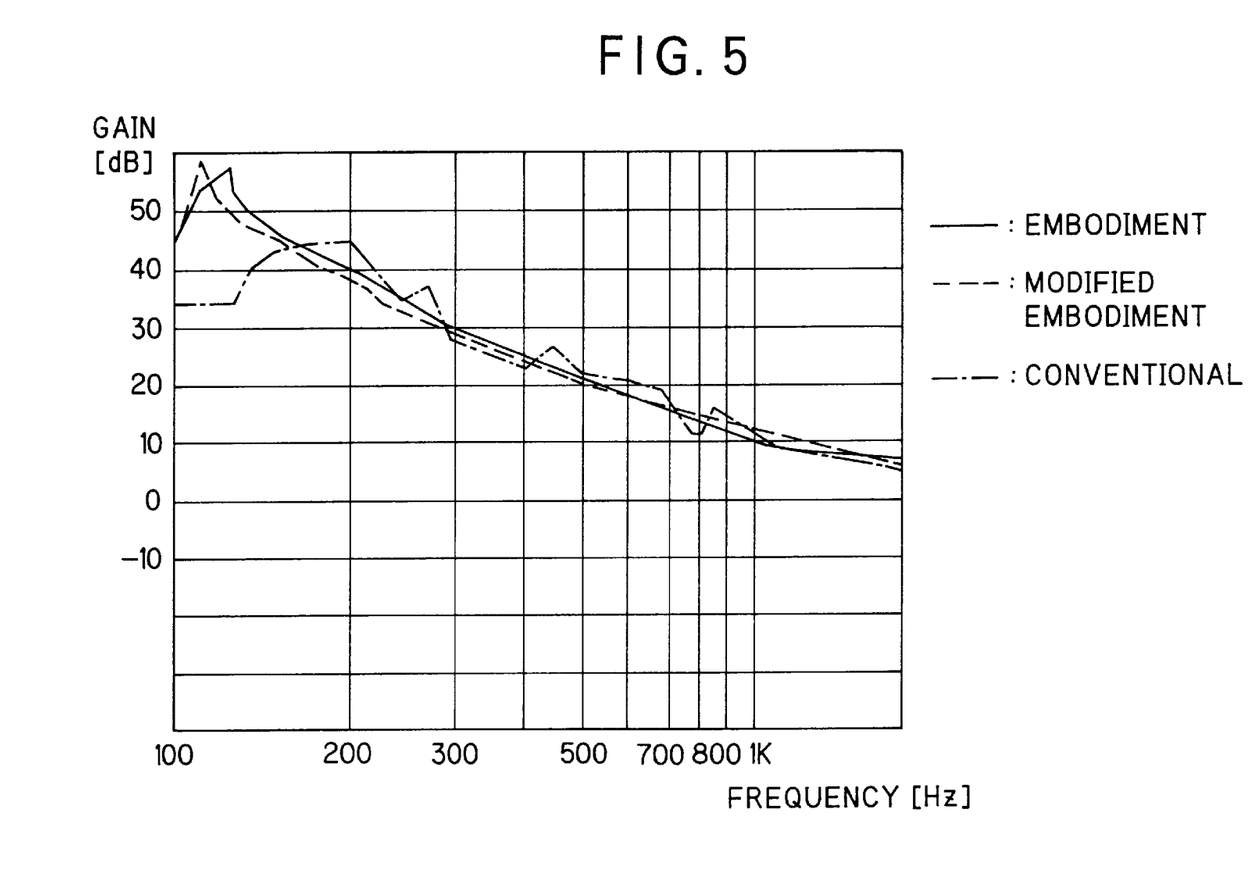
FIG. 5 is a graph showing a relationship between a focus servo gain [dB] and a focus servo frequency [Hz] in the embodiment corresponding to FIG. 3 and the modified embodiment corresponding to FIG. 4.

FIG. 5 is a graph showing a relationship between a focus servo gain and a frequency of the focus servo in the optical disc driving apparatus of the present embodiment. In FIG. 5, the vertical axis represents the focus servo gain [dB], while the horizontal axis represents the frequency [Hz] of the focus servo. In FIG. 5, a solid line indicates a gain characteristic curve of the optical disc driving apparatus having the 3 abutting portions (corresponding to FIG. 3), a broken line indicates a gain characteristic curve of the optical disc driving apparatus having the 5 abutting portions (corresponding to FIG. 4), and a chain line indicates a gain characteristic curve of the conventional optical disc driving apparatus having the circumferential abutting portion (corresponding to FIG. 6). As understood from FIG. 5, in case of the conventional optical disc driving apparatus, there is a certain disturbance in the characteristic due to the generation of the resonance between the actuator and the optical disc in the frequency range of about 700 Hz to 800 Hz. On the contrary, in case of the optical disc driving apparatuses of the embodiments, such a disturbance is not observed. It is understood that the generation of such a resonance is efficiently restrained according to the embodiments. Namely, by adopting the construction of the optical disc driving apparatus of the embodiments, it is possible to improve the focus servo characteristic in the frequency range of about 700 Hz to 800 Hz.

As described above in detail, according to the present embodiment, on each of the lines passing though the center of the optical disc 1, the forces are not simultaneously applied in the directions different from each other. Accordingly, the vibration of the inherent vibration mode of the optical disc 1, which causes the resonance of the actuator for the servo control and the optical disc 1, can be certainly restrained. Further, by virtue of the proximity portion 12, the backlash of the optical disc 1 and the clamper 3 due to the reduction in the abutting area in the circumferential direction of the optical disc 1 can be restrained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disc driving apparatus comprising:
a turn table on which a disc type record medium is loaded, the disc type record medium having a surface and a center hole, the center hole penetrating the disc type record medium in a direction perpendicular to the surface of the disc type record medium, said turntable comprising:
   a hub having a cylindrical engaging portion for engaging with the center hole of the disc type record medium so that said disc type record medium is centralized with respect to said turntable, and a taper portion for guiding the center hole to the cylindrical engaging portion; and
   a circumferential loading surface for loading the disc type record medium thereon,
a clamper opposed to said turn table for clamping the disc type record medium on said turn table by means of a magnetic force applied between said turn table and said clamper, said clamper being separate from said turntable and being fixed in position with respect to said turntable by means of the magnetic force when said disc type record medium is loaded, said clamper comprising:

at least 3 abutting portions for abutting to the surface of the disc type record medium such that only one of said abutting portions is respectively on a line passing through a center of said clamper in a plane parallel to the surface of the disc type record medium, each of said abutting portions contacting the surface of said disc type record medium at a position isolated from said center hole in a radial direction from said center hole, and at least one of said abutting portions comprising a flat surface having a length in a radial direction longer than a length in a rotational direction;

a taper portion proximate to the taper portion of said hub when clamping the disc type record medium; and a proximity portion, which is formed at a connection between the taper portion of said clamper and each of said abutting portions and is disposed more proximate to said hub than the taper portion of said clamper in a radial direction of the disc type record medium; and, a spindle motor for rotationally driving said turn table, wherein said disc driving apparatus restrains a resonance of the disc type record medium.

2. A disc driving apparatus according to claim 1, wherein each of said abutting portions is shaped in a sector disposed substantially at equiangular positions in a circumferential direction of said clamper.

3. A disc driving apparatus according to claim 1, wherein said clamper has a yoke for receiving the magnetic force from said hub and absorbing said clamper onto said turn table.

4. A disc driving apparatus according to claim 1, wherein each of said abutting portions has a shape defined by a first area bounded between a inner arc and a first outer arc combined with a second area bounded between said first outer arc and a second outer arc.

5. A method of damping vibration in a rotating disc type record medium, the method comprising:

urging at least three abutting portions into contact with a surface of the rotating disc type record medium, whereby any line in the plane of the surface of the rotating disc type record medium intersecting a center of the rotating disc type medium intersects one and only one of said abutting portions, and wherein at least one of said abutting portions comprises a flat surface having a length in a radial direction longer than a length in a rotational direction;

rotating said abutting portions at a speed of rotation the same as a speed of rotation of the rotating disc type record medium; and, restraining a resonance of said disc type record medium with at least one of said at least three abutting portions, wherein said disc type record medium has a center hole and said abutting portions contact the surface of the disc type record medium at a radial distance from an edge defined by the intersection of the surface of the disc type record medium and the center hole.

6. The method of claim 5, wherein said rotating disc type record medium is positioned on a turntable and said turntable comprises a hub and a circumferential loading surface.

7. The method of claim 6, wherein said at least three abutting portions are connected to a clamper, and said step of urging at least three abutting portions into contact with a surface of the rotating disc type record medium being accomplished by magnetic attraction between said hub and said clamper.

8. The method of claim 5, wherein each of said abutting portions is disposed at substantially equiangular positions in a circumferential direction of the rotating disc type record medium.

9. The method of claim 6, wherein each of said abutting portions has a shape defined by a first area bounded between a inner arc with ends and a first outer arc with ends combined with a second area bounded between said first outer arc and a second outer arc with ends, each of said arcs having a center at the center of the rotating disc type medium, said first area being additionally bounded by lines connecting the ends of said inner arc to the ends of said first outer arc, said lines radiating from the center of the center of the rotating disc type medium, and said second area being additionally bounded by lines radiating from the center of the center of the rotating disc type medium, intersecting said first outer arc and connecting to the ends of said second outer arc.

10. A disc driving apparatus comprising:

a means for urging at least three abutting portions into contact with a surface of a disc type record medium, said disc type record medium having a surface such that only one of said abutting portions is respectively on a line passing through a center of said disc type record medium in a plane parallel to the surface and at least one of said abutting portions comprises a flat surface having a length in a radial direction longer than a length is a rotational direction; and a means for rotating said disc type record medium, wherein said disc type record medium has a center hole and said abutting portions contact the surface of the disc type record medium at a radial distance from an edge defined by the intersection of the surface of the disc type record medium and the center hole and wherein each of said abutting portions having a shape adapted to restrain a resonance of said disc type record medium.

11. A disc driving apparatus according to claim 10, wherein said means for rotating said disc type record medium comprises:

a turn table on which said disc type record medium is loaded, and a spindle motor for rotationally driving said turn table.

12. A disc driving apparatus according to claim 11, wherein said means for urging at least three abutting portions into contact with a surface of a disc type record medium comprises:

a clamper opposed to said turn table for clamping said disc type record medium on said turn table by means of a magnetic force applied between said turn table and said clamper, said clamper comprising at least three abutting portions, said abutting portions abutting said disc type record medium whereby any line in the plane of the surface of said disc type record medium intersecting a center of said disc type record medium intersects one and only one of said abutting portions.

13. A disc driving apparatus according to claim 12, wherein:

said disc type record medium having a center hole, said center hole penetrating said disc type record medium in a direction perpendicular to said surface of said disc type record medium;

said turn table comprises: a hub having a cylindrical engaging portion for engaging said center hole of said disc type record medium and a taper portion for guiding said center hole to said cylindrical engaging portion; and said clamper comprises: a taper portion proximate to said taper portion of said hub when clamping said disc type record medium; and a proximity portion formed at a connection between said taper portion of said clamper and each of said abutting portions, said proximity portion disposed substantially parallel to said cylindrical engaging portion.

14. A disc driving apparatus according to claim 13 wherein said clamper has a yoke for receiving magnetic force from said hub.

15. A disc driving apparatus according to claim 12 wherein each of said abutting portions is disposed substantially at equiangular positions in a circumferential direction of said clamper.

16. A disc driving apparatus according to claim 11, wherein said turn table comprises:

a circumferential loading surface for loading the disc type record medium thereon.

17. A disc driving apparatus according to claim 11 wherein each of said abutting portions has a shape defined by a first area bounded between a inner arc and a first outer arc combined with a second area bounded between said first outer arc and a second outer arc.

\* \* \* \* \*